(12) United States Patent
Bickley

(10) Patent No.: US 7,337,761 B2
(45) Date of Patent: Mar. 4, 2008

(54) FUEL SYSTEM

(75) Inventor: Daniel James Bickley, Solihull (GB)

(73) Assignee: Goodrich Control Systems Limited (GB)

( * ) Notice: Subject to any disclaimer, the term of this patent is extended or adjusted under 35 U.S.C. 154(b) by 104 days.

(21) Appl. No.: 11/408,338

(22) Filed: Apr. 21, 2006

(65) Prior Publication Data

US 2006/0236981 A1 Oct. 26, 2006

(30) Foreign Application Priority Data

Apr. 22, 2005 (GB) ................................. 0508126.0

(51) Int. Cl.
*F02B 77/08* (2006.01)
*F02C 7/22* (2006.01)

(52) U.S. Cl. ............. 123/198 DB; 60/734; 137/565.36

(58) Field of Classification Search ......... 123/198 DB; 60/39.094, 39.281, 734; 137/565.01, 565.013, 137/565.36

See application file for complete search history.

(56) References Cited

U.S. PATENT DOCUMENTS

| | | | |
|---|---|---|---|
| 6,401,446 B1* | 6/2002 | Gibbons | 60/39.281 |
| 6,981,359 B2* | 1/2006 | Wernberg et al. | 60/39.281 |
| 7,007,452 B1* | 3/2006 | Baryshnikov et al. | 60/39.094 |
| 7,096,658 B2* | 8/2006 | Wernberg et al. | 60/39.281 |
| 7,131,274 B2* | 11/2006 | Baryshnikov et al. | 60/772 |

* cited by examiner

*Primary Examiner*—Thomas Moulis
(74) *Attorney, Agent, or Firm*—Andrus, Sceales, Starke & Sawall, LLP

(57) ABSTRACT

A fuel system comprises a spill valve 38 operable to relieve the fuel pressure differential across at least one positive displacement pump 16, 18, a shut-off valve 32 operable to control the supply of fuel to an engine 84, and a two stage servo-valve 62 operable to control the operation of the shut-off valve 32, the spill valve 38 having a control chamber 40 the fluid pressure within which is controlled so as to be held at an intermediate level during engine shutdown.

8 Claims, 3 Drawing Sheets

FUEL SYSTEM

This invention relates to a fuel system, and in particular to the fuel system for an aircraft engine.

A known aircraft engine fuel system uses an engine driven positive displacement pump such as a gear pump to supply fuel to a metering valve. A pressure drop and spill valve is used to control the fuel pressure differential across the metering valve. Fuel from the metering valve is supplied to the engine's burners through a pressure raising and shut-off valve (PRSOV). At least a minimum pressure differential is maintained across the gear pump at all times, in normal use, for actuation and fuel metering purposes.

A single stage servo-valve is used to apply high pressure to part of the pressure raising and shut-off valve, when it is desired to shut down the engine, so as to terminate the supply of fuel to the engine. As well as closing the pressure raising and shut-off valve, the servo-valve is operable to connect part of the pressure drop and spill valve to low pressure to cause this valve to open and reduce the pressure differential across the gear pump. If the pressure drop and spill valve were not opened, the pressure downstream of the pump would rise, placing additional loadings on the pump which may reduce its working life.

Normal engine shut down in this manner is relatively slow as fluid is ported to the various locations through relatively small flow restrictors. There are situations, for example emergencies, in which it is desired to shut down the engine more rapidly. In order to achieve this it is known to provide a second, two stage servo-valve connected in parallel with the single stage servo-valve. By using a two stage servo-valve, larger area flow restrictions to control the supply of fluids to the pressure raising and shut-off valve and to the pressure drop and spill valve can be used, thereby allowing them to be operated more quickly, and hence allowing engine shut-down to be accomplished more quickly.

In order to reduce cost and weight it is desirable to provide only one servo-valve for use in engine shut-down. The high speed shut-down capability has to be maintained to allow fast shut-down during, for example, emergency situations, and so a two stage servo-valve is desirable.

Although, on engine shut-down, it is desirable to ensure that the fuel pressure differential across the gear pump does not rise significantly, it is also desirable to prevent this fuel differential pressure dropping too quickly to a low level in order to ensure that other fuel pressure operated circuits of the aircraft can continue to operate for a short time. Simply omitting the single stage servo-valve and using the second, two stage servo-valve to initiate all engine shut down events is thus not a satisfactory solution as the fuel pressure within the supply line drops too quickly when such a valve is used.

According to the present invention there is provided a fuel system comprising a spill valve operable to relieve the fuel pressure differential across at least one positive displacement pump, a shut-off valve operable to control the supply off fuel to an engine, and a two stage servo-valve operable to control the operation of the shut-off valve, the spill valve having a control chamber the fluid pressure within which is controlled so as to be held at an intermediate level during engine shut-down.

As a result, fast shut-down can still be achieved and an unacceptably high fuel pressure differential across the pump avoided, whilst maintaining an acceptable fuel pressure within the fuel supply line to allow continued operation of circuits operated therefrom, after fuel to the engine has been cut-off but while the engine continues to rotate.

Preferably, the control chamber of the spill valve communicates with a port provided on the shut off-valve. As a result, the pressure applied to the control chamber of the spill valve may be controlled, at least in part, by the shut-off valve.

The port may be arranged to open upon movement of the shut-off valve to terminate the supply of fuel to the engine. Alternatively, the port may be arranged to close, or partially close, upon such movement. In either case, the operation of the shut-off valve can be used to apply a predetermined intermediate pressure to the control chamber to hold the fuel pressure in the fuel supply line at or substantially at a predetermined level above gear pump inlet pressure. The continued operation of circuits driven by the fuel pressure in the supply line may thus be achieved at least for a short period of time, after fuel flow to the engine has been shut-off but while the engine continues to rotate.

In one arrangement, operation of the two stage servo-valve to initiate closure of the PRSOV in order to terminate flow to the engine, may result in the fuel pressure within the control chamber being relieved temporarily, subsequent opening of the port allowing the fuel pressure within the control chamber to be held at the intermediate level Alternatively, the closure or partial closure of the port may be used to hold the pressure within the control chamber at the intermediate level.

The invention will further be described, by way of example, with reference to the accompanying drawings, in which.

Figure 1:
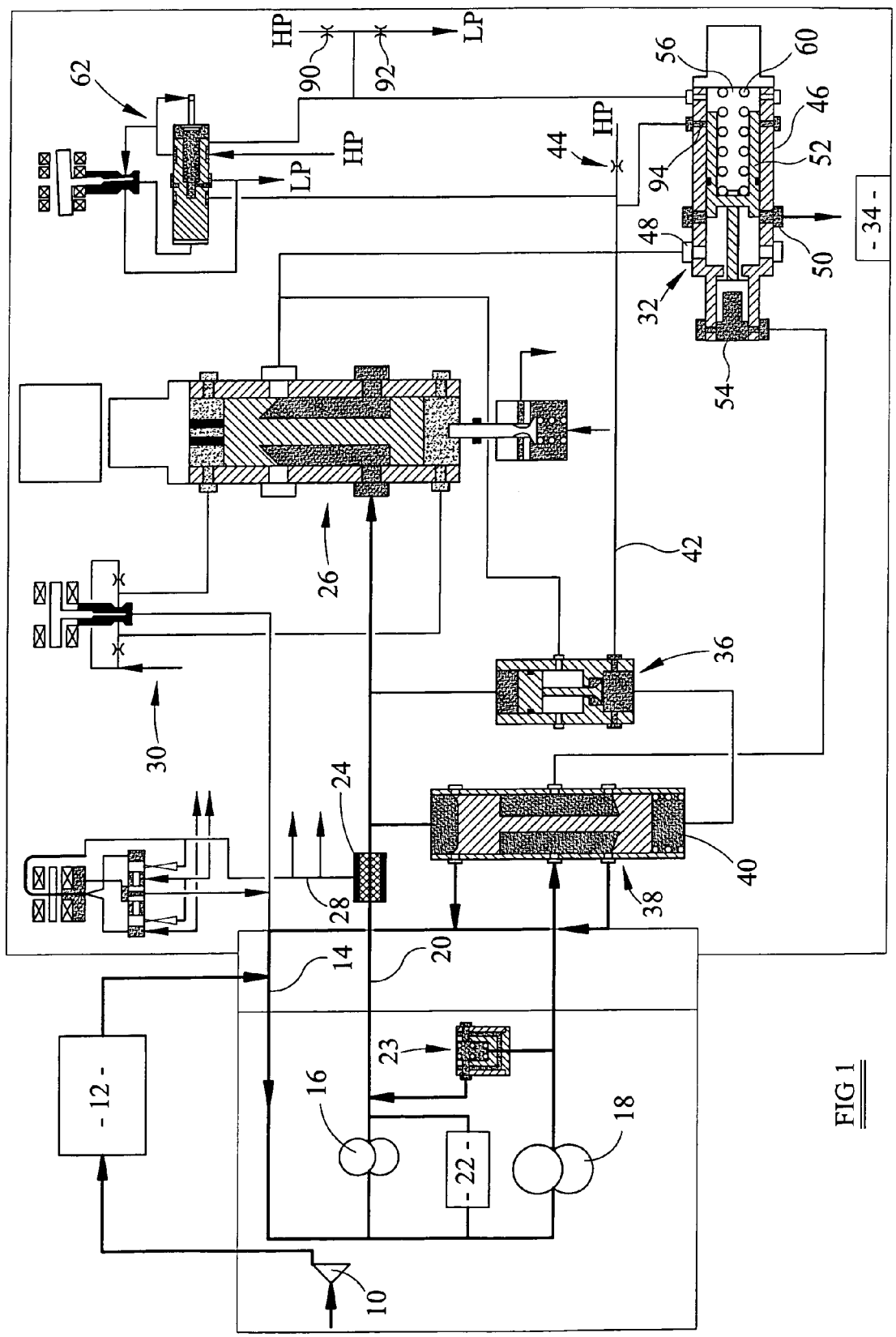
FIG. 1 is a diagrammatic view illustrating a fuel system in accordance with one embodiment of the invention.

Referring firstly to FIG. 1 there is illustrated, diagrammatically, the fuel system for an aircraft engine. The fuel system comprises a low pressure pump 10 arranged to supply fuel from a reservoir through a filter 12 to a low pressure line 14. Gear pumps 16, 18 supply the fuel to a high pressure supply line 20. A pressure relief valve 22 is provided to allow fuel to pass from the high pressure supply line 20 to the low pressure line 14 to relieve the pressure in the high pressure supply line 20 in the event that the pressure therein exceeds a predetermined level. The provision of such a valve 22 is advantageous in that it avoids so-called "dead-heading" of the pumps 16, 18 which can be detrimental to the working lives thereof. A non-return valve 23 is provided between the outlet of the gear pump 18 and the high pressure supply line 20.

Although this arrangement uses two gear pumps, the invention is also applicable to systems having, for example, only one gear pump.

Although gear pumps have been described in this application, other positive displacement pumps such as vane pumps or piston pumps may be used.

The fuel within the high pressure supply line 20 is passed through a flow washed filter 24 to an inlet port of a metering valve 26. A control line 28 communicates with the flow washed filter 24, the control line 28 being connected to a number of hydraulic circuits of the aircraft to supply fuel under high pressure thereto for use in the control of a number of devices. One of the circuits to which fuel is supplied from the line 28 is the control circuit 30 of the metering valve 26. It will be appreciated, however, that many other circuits may also be driven from the control line 28.

Fuel from the metering valve 26 is supplied through a pressure raising and shut-off valve 32 (PRSOV) to the engine's burners 34.

A pressure drop control valve 36 is connected across the metering valve 26 and operates with a combining spill valve 38 (see below) to maintain a substantially constant pressure drop across the metering valve 26.

The combining spill valve 38 communicates with the high pressure supply line 20 and is operable to control the fuel pressure within the high pressure supply line 20 dependent, at least in part, upon the pressure within a control chamber 40 thereof. In the event that the pressure within chamber 40 is reduced, then the combining spill valve 38 will open to allow some fuel to pass to the low pressure line 14 reducing the fuel pressure within the high pressure supply line 20. The combining spill valve 38 is used in conjunction with the pressure drop control valve 36 to control the pressure differential across the metering valve 26.

The control chamber 40 communicates with a control line 42 which is connected, via a flow restrictor 44 with the line 28. A spring is located in the control chamber 40 to urge the spill valve towards its closed position.

Although this arrangement makes use of separate pressure drop control and spill valves, it will be appreciated that the invention is also applicable to arrangements in which these functions are combined into a single valve.

The PRSOV 32 comprises a housing 46 having an inlet port 48 to which fuel is supplied from the metering valve 26, and an outlet port 50 connected to the burners 34. A valve member 52 is moveable between an open position (as shown) in which fuel is able to flow to the outlet port 50, and a closed position in which the valve member 52 covers the outlet port 50 and prevents such fuel flow.

A first chamber 54 is formed between the housing 46 and valve member 52 at one end of the valve member 52. Fuel supplied by the gear pump 18, is supplied to the first chamber 54.

A second chamber 56 is formed at the opposite end of the valve member 52 to which fuel is supplied from a line 58. The second chamber 56 is of larger diameter than the first chamber 54. A spring 60 is provided in the second chamber 56 so as to urge the valve member 52 to its closed position in order to shut-off fuel to the engine.

Figure 2:
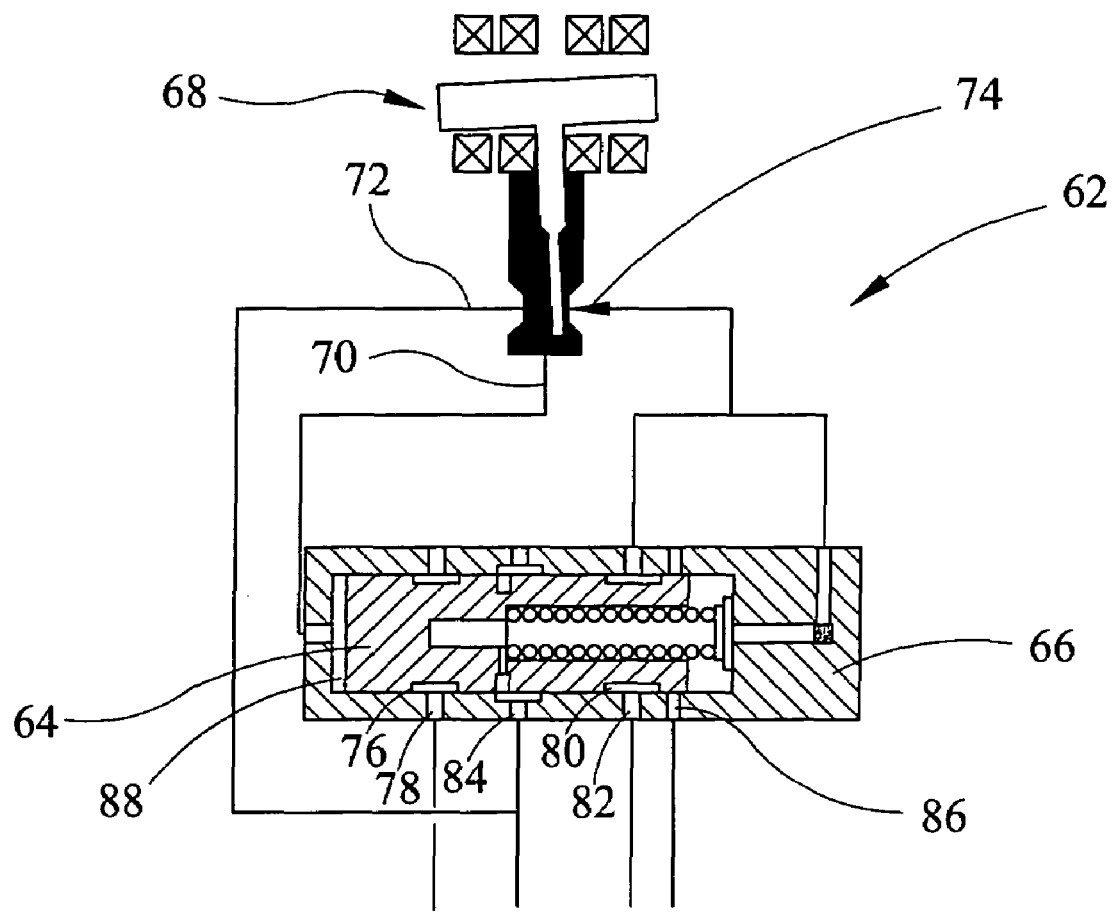
FIG. 2 illustrates part of the fuel system of FIG. 1.

A two stage servo-valve 62 is used to control the shut-down operation of the RSOV 32. The two stage servo-valve 62 comprises a spool 64 slidable within a housing 66 (see FIG. 2). The valve 62 further comprises a torque motor actuated valve 68 operable to connect a common port 70 thereof either to a first inlet port 72 or to a second inlet port 74.

The spool 64 is shaped to define a first annular chamber 76 which, throughout the range of movement of the spool 64, communicates within a port 78. The spool 64 further defines a second annular chamber 80 which, throughout the range of movement of the spool 64, communicates with a port 82.

A further port 84 is located such that, upon movement of the spool 64 away from the position illustrated, the first annular chamber 76 communicates with the port 84 to provide a flow path between the ports 78, 84. In this position, the second annular chamber 80 communicates with a port 86 to form a flow path between the ports 82, 86.

A chamber 88 is defined between one end of the spool 64 and the housing 66, the chamber 88 communicating with the common port 70 of the valve 68. The port 84 and first inlet port 72 are in constant communication with the low pressure line 14. The port 82 and second inlet port 74 are in constant communication with the control line 28 and are thus at high pressure. The port 78 communicates with the control line 42 via annular chamber 76 and port 84, and the port 86 communicates with the line 58, via annular chamber 80 and port 82.

The line 58, as well as communicating with the port 86, also communicates with a point between a pair of flow restrictors 90, 92 connecting the line 58 to the control line 28 and the low pressure line 14, respectively. The restrictors 90, 92 form a potentiometer network holding the line 58 and control chamber 56 at an intermediate pressure when the port 86 is closed.

A spill control port 94 is provided on the shut-off valve 32, the port 94 being closed by the valve member 52 when the shut-off valve 32 is open and allowing fuel flow to the burners 34 and opening upon closure of the valve 32 to bring the spill control port 94 into communication with the chamber 56. The spill control port 94 communicates with the control line 42.

FIG. 1 illustrates the fuel system in normal use, fuel being supplied to the burners 34, and the control chamber 40 being held at relatively high pressure by its connection to the line 28 through the restriction 44 to maintain a desired differential pressure across the metering valve 26. The chamber 88 of the two-stage servo-valve 62 is at low pressure and the spool 64 is held in position by a spring.

In order to shut-down the engine, either as part of the normal shut-down procedure or when a fast shut down is required, the torque motor actuated valve 68 is switched to break communication between the first inlet port 72 and the common port 70 and instead to establish communication between the common port 70 and the second inlet port 74. This results in the chamber 88 being pressurised to high pressure, causing the spool 64 to move to the right, in the orientation illustrated. Such movement rapidly establishes communication of the port 78 with the port 84 via the first annular chamber 76 and of the port 82 with the port 86 via the second annular chamber 80.

The communication established between the port 82 and the port 86 pressurises the line 58 and chamber 56 to an extent sufficient to cause movement of the valve member 52 to close the port 50 and thereby terminate fuel supply to the burner 34. The engine will thus shut-down.

At the same time, the connection of the control line 42 to low pressure due to the communication of the port 78 with the port 84, and to high pressure due to the spill control port 94 opening upon movement of the valve member 52 results in the control chamber 40 of the spill valve 38 falling to an intermediate pressure thereby ensuring that the high pressure supply line 20 is held at a reduced pressure sufficient to operate the circuits supplied from the line 28 but at which the load on the gear pumps 16, 18 is sufficiently low that the pump life is not significantly affected.

It will be appreciated, therefore, that a fast shut down is achieved.

It will be appreciated that suitable intermediate pressures for chamber 40 can be achieved during shut-down in the absence of port 94 by controlling the size of the restriction between Lines 42 and 14 via ports 78 and 84 of servo-valve 62 relative to that of restrictor 44. In this circumstance, the restriction between Lines 42 and 14 of the servo-valve 62 would be dictated by the size of the restrictor 44 and the required intermediate pressure. In a typical system the size of the restriction 44 would force the restriction between Lines 14 and 42 in servo-valve 62 to be smaller than required to open the spill valve 38 at a suitable velocity for rapid shut-down. Such a system would experience a rapid and a large increase in pressure rise across the high pressure pump(s) as the PRSOV 32 shuts rapidly, but the spill valve 38 opens slowly. The increase in pressure rise is undesirable due to its effect on pump loads and wear.

The system described is advantageous in that rapid shut-down can be achieved using a single servo-valve, and the pressure differential across the high pressure gear pump(s) can be maintained at a sufficient level, typically 200 to 250 psi, to allow circuits to continue to operate for a period of time after shut-off of fuel to the engine, while preventing undesirable transient increases in pressure differential across the gear pump(s).

Figure 3:
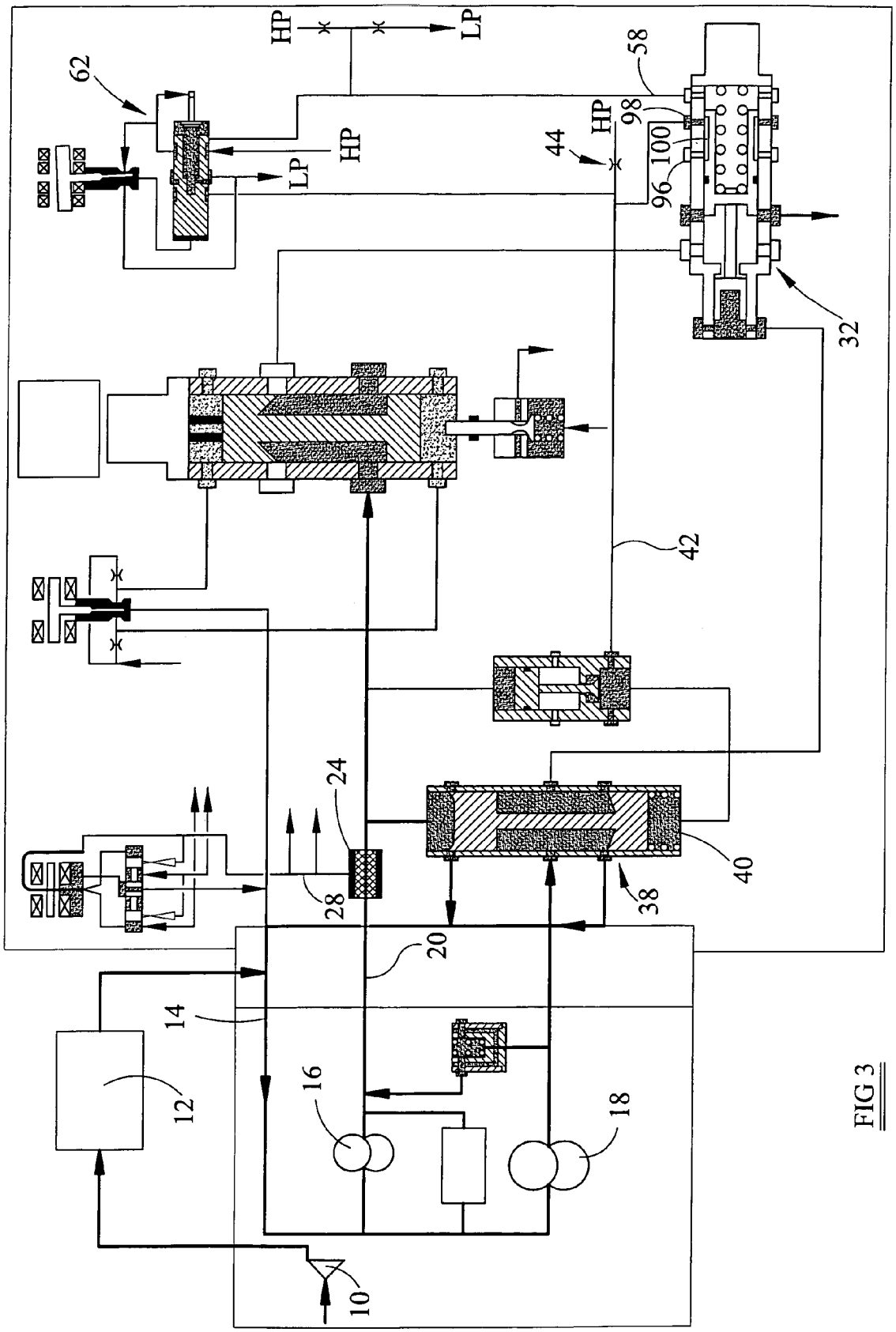
FIG. 3 illustrates a fuel system in accordance with a second embodiment.

There may be situations where the fuel pressure in the high pressure supply line 20 rises unacceptably due to the PRSOV 32 closing before the spill valve 38 opens. In the arrangement of FIG. 1, the intermediate pressure in the control chamber 40 is dependent upon the relative sizes of the restrictions to flow formed by the spill control port 94 and the communication between the port 78 and the port 84, as well as the size of the restriction 44. FIG. 3 illustrates an alternative arrangement in which, rather than provide a potentiometer network of this type, the communication between the low pressure port of the servo-valve 62 and the control chamber 40 is via a pair of ports 96, 98 and an annular chamber 100 provided in the PRSOV 32. With this arrangement, at the commencement of shut-down the ports 96, 98 and chamber 100 provide a fairly unrestricted connection between the chamber 40 and the low pressure port of the servo-valve 62 and low pressure, so the spill valve 38 opens rapidly to avoid the formation of a pressure spike in the high pressure supply line 20. Subsequently, as the shut-off valve 32 closes, the valve member 52 partially closes the port 98, thereby forming a greater restriction to flow serving to maintain the pressure in the control chamber 40 of the desired intermediate level Again, rapid shut-down is achieved whilst still permitting continued operation of circuits driven from the high pressure supply line 20.

It will be appreciated that a large number of modifications or alterations may be made to the systems described hereinbefore without departing from the scope of the invention.

The invention claimed is:

1. A fuel system comprising a spill valve operable to relieve the fuel pressure differential across at least one positive displacement pump, a shut-off valve operable to control the supply of fuel to an engine, and a two stage servo-valve operable to control the operation of the shut-off valve, the spill valve having a control chamber, and spill control means operable to control the fluid pressure within the control chamber so as to hold the fluid pressure at an intermediate level during engine shut-down.

2. A fuel system according to claim 1, wherein the spill control means comprises a port provided on the shut-off valve, the control chamber of the spill valve communicating with said port.

3. A fuel system according to claim 2, wherein the port is arranged to open upon movement of the shut-off valve to terminate the supply of fuel to the engine.

4. A fuel system according to claim 2, wherein the port is arranged to close, or partially close, upon movement of the shut-off valve to terminate the supply of fuel to the engine.

5. A fuel system according to claim 2 wherein the control chamber of the spill valve communicates with a fluid line connected through a restriction with a source of fuel at high pressure, the port being connected to the fluid line intermediate the control chamber and the restriction.

6. A fuel system according to claim 5, wherein the port controls communication between the fluid line and a source of fuel at low pressure.

7. A fuel system according to claim 5, wherein the port controls communication between the fluid line and a source of fuel at high pressure.

8. A fuel system according to claim 7, wherein the fluid line is further connected to a port of the two-stage servo-valve and the two stage servo-valve is operable to connect the fluid line to a source of fuel at low pressure, the port of the two stage servo-valve and the port of the shut-off valve serving as a fluid pressure potentiometer network.

* * * * *